Sept. 4, 1945.   J. R. HARRINGTON ET AL   2,384,167
REMOTE INDICATING, SUPERVISING OR CONTROL SYSTEM
Filed May 16, 1942   5 Sheets-Sheet 1
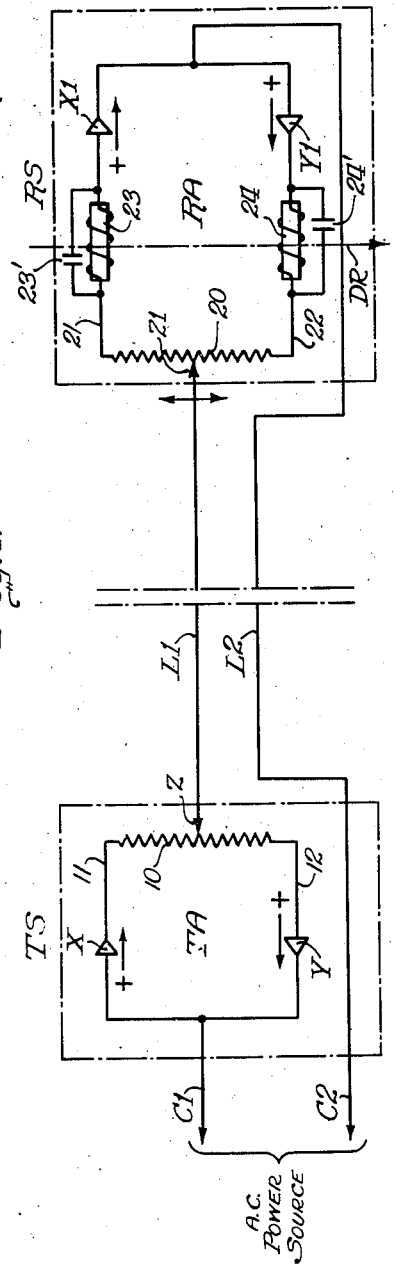
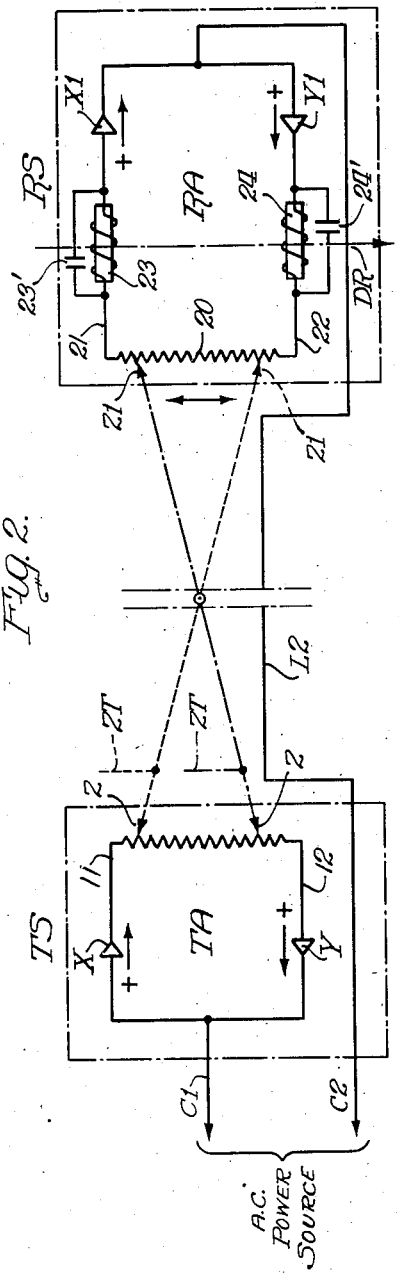
INVENTORS.
James R. Harrington
Roger L. Merritt
BY
Brown, Jackson, Boettcher & Dienner
Attys

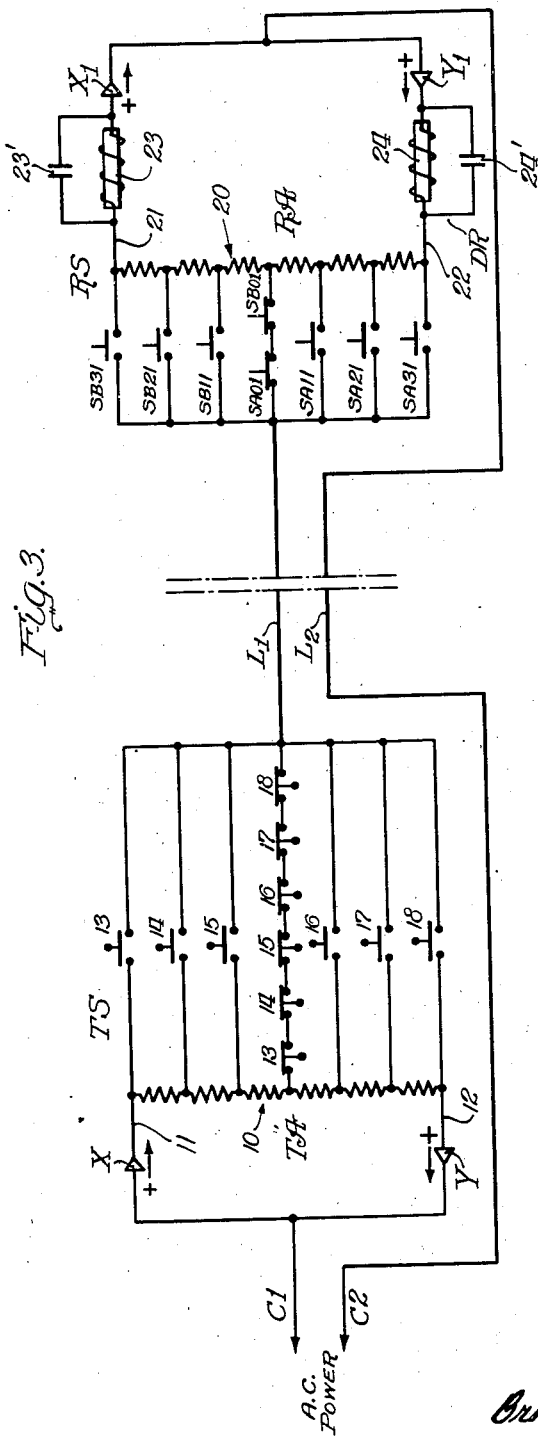

Sept. 4, 1945.   J. R. HARRINGTON ET AL   2,384,167
REMOTE INDICATING, SUPERVISING OR CONTROL SYSTEM
Filed May 16, 1942   5 Sheets-Sheet 3

INVENTORS:
James R. Harrington
Roger L. Merrill
BY
Attys.

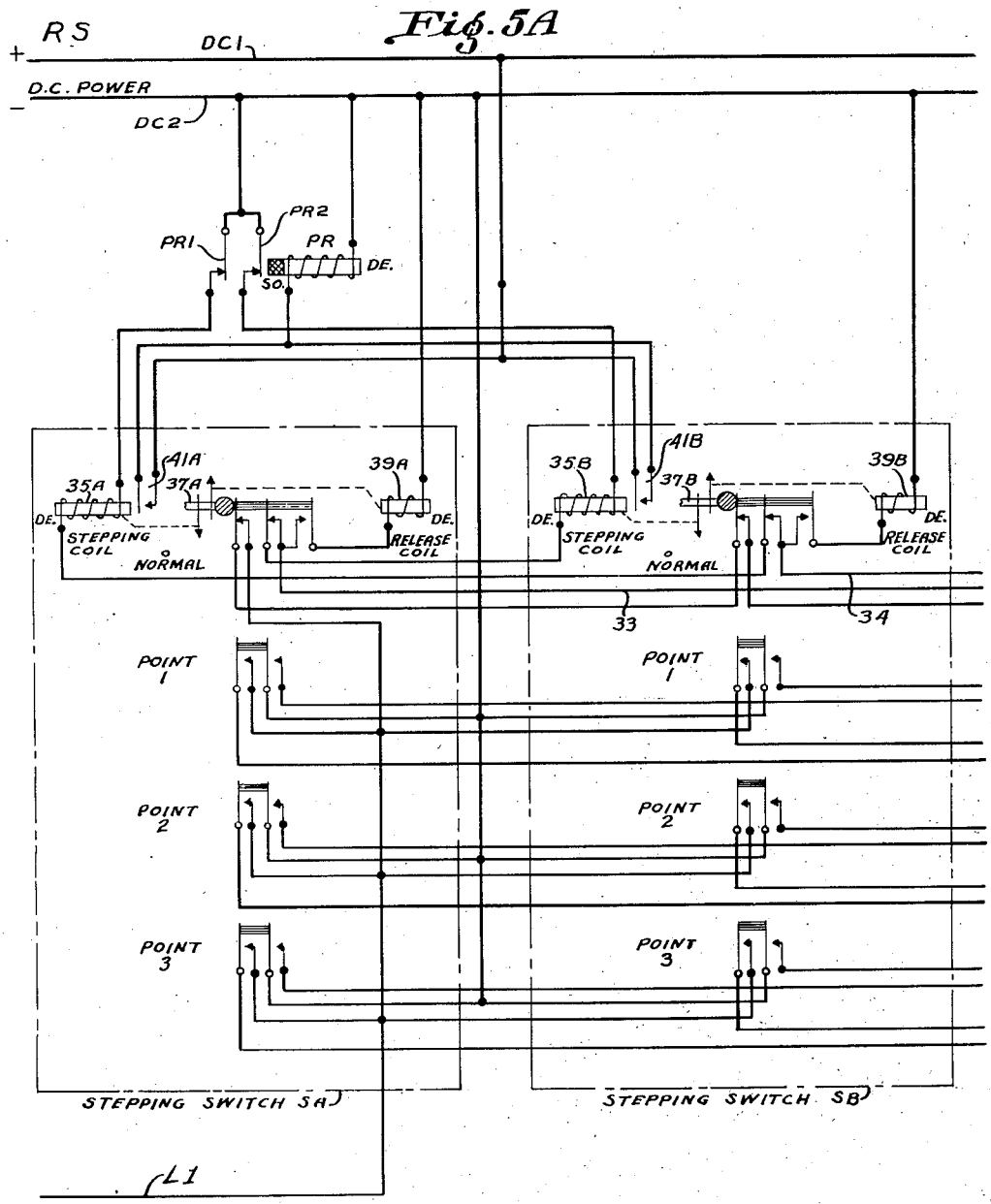

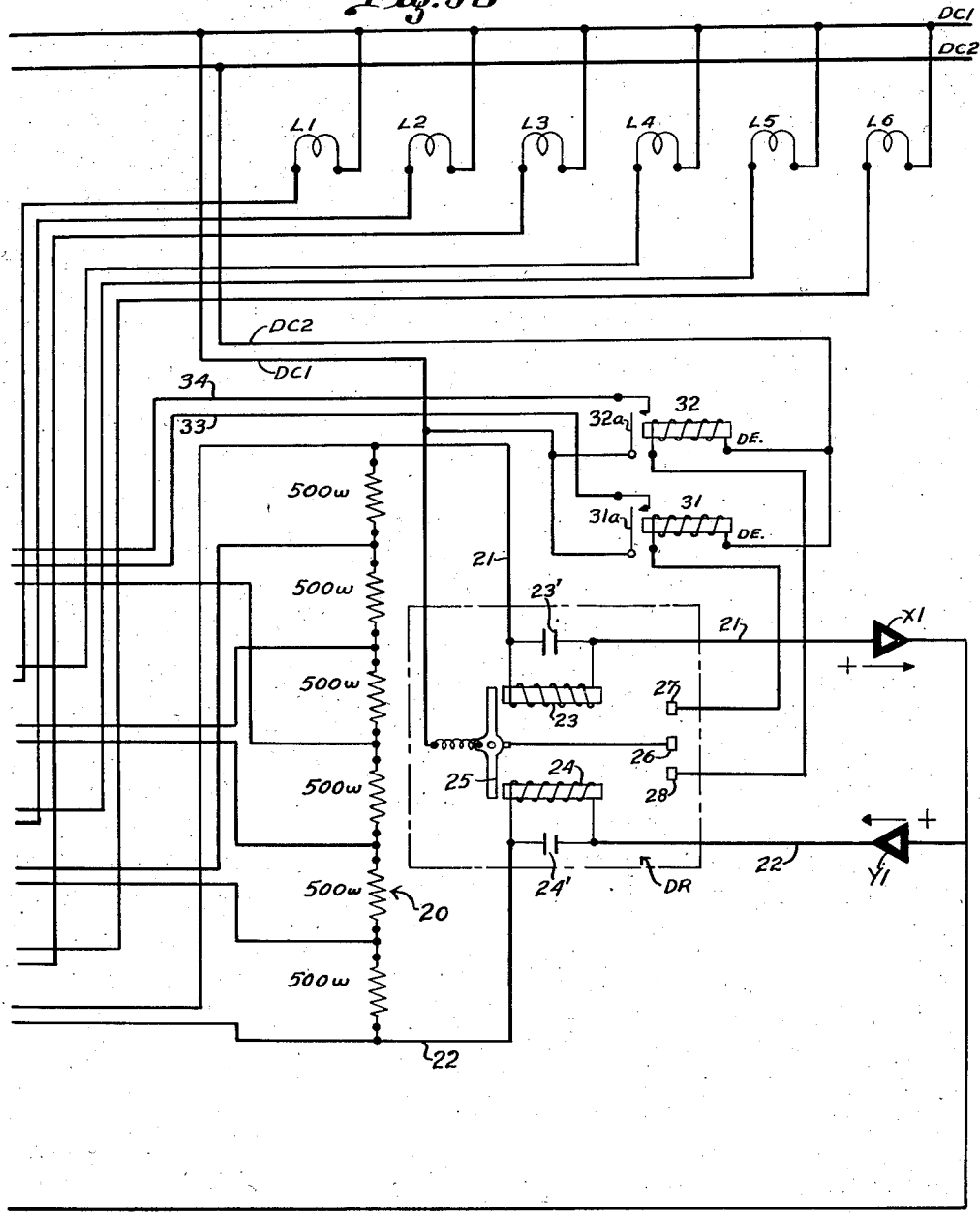

Patented Sept. 4, 1945

2,384,167

UNITED STATES PATENT OFFICE 2,384,167

REMOTE INDICATING, SUPERVISING, OR CONTROL SYSTEM

James R. Harrington, Mansfield, and Roger L. Merrill, Shelby, Ohio, assignors to The Autocall Company, Shelby, Ohio, a corporation of Ohio Application May 16, 1942, Serial No. 443,296

7 Claims. (Cl. 177—353)

The present invention relates to remote indicating, supervising or control systems wherein an indicating, supervising or control condition which occurs or is established at one point or station is transmitted electrically over an interconnecting circuit to another point or station which is usually situated relatively remote from the first point or station.

If the system is employed for remote indicating purposes, the indications may be effected by annunciator lamps or the like, or the indications may be effected by telemetering movements of a movable indicator. The system enables different circuits to be selected and controlled at the receiving station, and this enables supervisory or control functions to be performed over the system from one station to another. The most prevalent use of my improved system occurs in electrical power distribution networks where signals for performing an indicating, supervising or control function are transmitted from a central station to a substation or from a substation to the central station.

One of the features of the invention resides in an improved mode of operation characterized by the act of unbalancing the electrical circuit at the transmitting station and then rebalancing the circuit at the receiving station. More particularly, this feature resides in transmitting a predetermined signal for a predetermined degree of movement from transmitting apparatus at a transmitting station to receiving apparatus at a receiving station by creating a predetermined degree of electrical unbalance in the circuit at the transmitting station, and causing the receiving apparatus at the receiving station to automatically rebalance the circuit at the receiving station, this rebalancing operation constituting the signalling operation or being a measure of the degree of movement to be transmitted to the receiving station.

Another feature of the invention resides in employing alternating current as the energizing or transmitting medium on which the various degrees of electrical unbalance are impressed.

Another feature of the invention resides in creating and transmitting these various degrees of electrical unbalance by shifting the neutral axis of this alternating current upwardly or downwardly relatively to the upper or lower half of the cycle.

Another feature of the invention resides in employing polarizing means for causing certain branches of the system to have unilateral conductivity in opposite directions, whereby the system can operate with only two connecting conductors extending between stations, and whereby other operating advantages are obtained.

Other features, objects and advantages of the invention will appear from the following detail description of two preferred embodiments of the invention. In the accompanying drawings illustrating such embodiments:

Figure 1 is a schematic circuit diagram prepared for the purpose of facilitating an understanding of the basic operating principles of the invention;

Figure 2 is a circuit diagram similar to Figure 1 showing different electrical unbalancing operations occurring at the transmitting station, and showing the corresponding rebalancing operations occurring at the receiving station;

Figure 3 is a schematic circuit diagram showing an embodiment wherein the unbalancing and rebalancing operations are performed by successively actuated switches;

Figure 4 is a chart of the legends and symbols used in the circuit diagrams; and Figures 5, 5A and 5B are related parts of a more complete circuit diagram of the preferred form of our improved system. Figure 5 illustrates the transmitting station, and Figures 5A and 5B illustrate the receiving station, these three figures showing the entire system when joined end to end.

Figure 5:
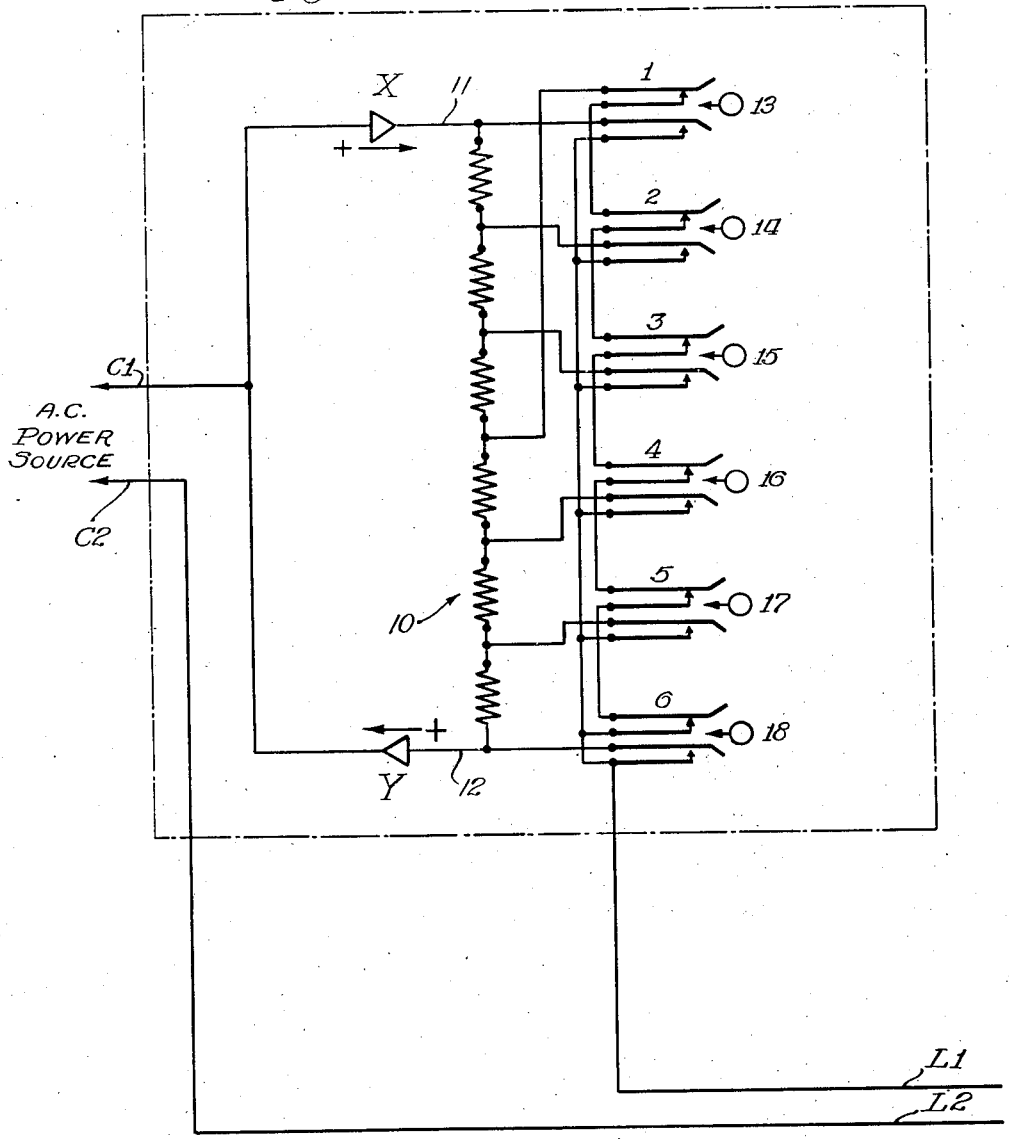

In each of the circuit diagrams the transmitting station from which the indicating, supervising or control signal originates is indicated by the dotted rectangle TS, and the receiving station where this signal is received is indicated by the dotted rectangle RS. When the invention is employed for performing a supervising, telemetering or like indicating function in a typical power distribution system, a substation will usually be the transmitting station TS, and the central office or central station of the system will usually be the receiving station RS. Conversely, when the invention is employed for performing a remote control or like function, as for example to control the position of apparatus at a substation, the central station will then be the transmitting station TS and the substation will then be the receiving station RS.

The system is energized from a source of current supply impressed on supply conductors C1 and C2. These conductors can supply the energizing current to our improved system either at the transmitting station end of the system or at the receiving station end. The source of current supply is preferably an alternating current or other continuously varying current. A 60- cycle alternating current is preferable for the reason that it is a standard source of current supply which is readily available and because standard apparatus designed for this frequency is also readily available. However, in lieu of a 60-cycle alternating current, other alternating currents of different frequencies may be employed, or direct currents which are pulsated or varied, periodically or continuously, may be employed, or combinations of such alternating and direct currents.

In the basic diagram of Figure 1, two conductors L1 and L2 are shown as making up the interconnecting circuit extending between the stations TS and RS. The transmitting apparatus TA comprises a variable resistance 10 through which the unbalancing operation is performed, and the receiving apparatus RA comprises a substantially similar variable resistance 20 through which the rebalancing operation is performed. At the transmitting station, the end terminals of the transmitter resistor 10 connect with the upper and lower branches 11 and 12 of a divided circuit, and at the receiving end of the system the receiving resistor 20 has its end terminals connected with the upper and lower branches 21 and 22 of a divided circuit. When the source of alternating current supply is connected to the transmitting station end of the system, the conductor C1 connects with the divided circuit branches 11 and 12, and the interconnecting line conductor L2 connects with the other divided circuit branches 21 and 22; but if the source of supply is connected to the receiving station end of the system this relationship is reversed. At the transmitting station a polarizing stack X is interposed in the branch path 11 and an oppositely facing polarizing stack Y is interposed in the other branch path 12. Similarly, at the receiving station a polarizing stack X1 is interposed in the upper branch path 21 and an oppositely facing polarizing stack Y1 is interposed in the lower branch path 22. The polarizing stacks X and X1 face in the same direction to establish unilateral conductivity therethrough, and the other polarizing stacks Y and Y1 both face in the opposite direction to establish unilateral conductivity therethrough in the opposite direction. Said polarizing stacks are typically represented by half cycle copper oxide rectifiers or selenium rectifiers. The stacks are arranged in the circuit so that positive current will pass through these stacks in the direction indicated by the arrows. Positive current is blocked from passing through the stacks when impressed on the stacks in the opposite direction to that indicated by the arrows. Negative current is blocked from passing through the stacks in the same direction as positive current, but will pass through the stacks in the opposite direction to positive current.

Interposed in the upper branch 21 at the receiving station is an electromagnet 23, and interposed in the lower branch 22 is a similar electromagnet 24. If desired, these electromagnets may be shunted by condensers 23' and 24' respectively for by-passing surges, transient voltages, etc. The electromagnet 23 is energized by that portion of the alternating current cycle flowing to the right in branch 21, and the electromagnet 24 is energized by that portion of the alternating current cycle flowing to the left in branch 22. These two electromagnets constitute the actuating elements of a differential relay DR wherein said electromagnets act in opposition, so that a balanced current flow through both electromagnets will retain the differential relay in a neutral or normal position, but an unbalanced or greater current flow through either one of the electromagnets will cause an actuation of the relay in that direction. This will be later described in complete detail in connection with Figure 5B.

The system is constructed and arranged so that a balanced current flow will pass through the electromagnets 23 and 24 so long as the left hand end of conductor L1 remains connected to the midpoint of resistor 10 and so long as the right hand end of conductor L1 remains connected to the midpoint of the resistor 20. For facility of reference, the variable point of connection between line L1 and resistor 10 is designated Z, and the variable point of connection between line L1 and resistor 20 is designated Z1. It will be evident that if the point of connection Z should be moved upwardly along resistor 10 from the midpoint a condition of unbalance is immediately created in the system in that the resistance through the branch paths 11 and 21 is reduced and the resistance through the branch paths 12 and 22 is increased, thereby increasing the current flow through electromagnet 23 and reducing the current flow through electromagnet 24. To obtain a rebalanced condition of current flow through the two electromagnets, it would then be necessary to move the other point of connection Z1 in a downward direction from the midpoint. This latter movement of point Z1, when carried to a sufficient degree to effect the same change at resistor 20 as has been set up at resistor 10, results in a rebalanced current flow through electromagnets 23 and 24 so that the system assumes a rebalanced, although out-of-normal, condition. Conversely, if the point of connection Z should be moved in a downward direction relatively to resistor 10, the point of connection Z1 would have to be moved in an upward direction relatively to resistor 20. The up and down shift of the point of connection Z1 is effected automatically through the functioning of the differential relay DR, as will be later described.

The unbalancing and rebalancing action is schematically illustrated in Figure 2, where it will be seen that the upward movement of point Z is represented by the dotted line position, and the downward movement of point Z is represented by the dash and dot position. In the rebalancing operation, the point Z1 of the receiving station can be considered as endeavoring to stay in prolongation of the point Z at the transmitting station, from which it will be seen that the action of these two points of connection is analogous to a teeter-totter motion around a central fulcrum. The illustration in Figure 2 may be considered as disclosing one actual embodiment of the invention wherein a movable contact arm Z may be arranged to be actuated through any suitable operating connection ZT responsive to manual actuation, meter reading, measuring instrument or other like function. In such embodiment, the other variable point of connection Z1 would be actuated through the differential relay DR and associated devices, as hereinafter described.

Referring now to Figure 3, this schematically illustrates another embodiment wherein variations in resistor 10 are accomplished by the actuation of successive switches 13, 14, 15, 16, 17 and 18, each having tapped connection with said resistor at equidistantly spaced points. At the receiving station the point of connection of line conductor L1 with the resistor 20 is adapted to be varied through rotary stepping switch contacts SA01, SA11, SA21 and SA31 and through rotary stepping switch contacts SB01, SB11, SB21 and SB31. In this latter embodiment, the resistors 10 and 20 have only been shown as divided into six sections for a six step operation, but it will be understood that the apparatus can be designed for a greater number of steps if desired.

Referring to Figure 5, the selecting and operating switches 13 to 18, inclusive, are shown as being adapted for manual operation, but they might also be arranged to respond to supervisory functions, control functions and the like. It will be noted that when all of these switches stand in their normal unactuated positions they maintain a connection from the midpoint of the resistor 10 to the line conductor L1. Upon the actuation of any one of these switches, this midpoint connection is immediately interrupted and concurrently therewith another connection is established with the resistor 10 at a point corresponding to the number or position of the actuated switch in the series. As illustrative of typical values which may be employed, the total resistance of resistor 10 may be substantially 3000 ohms divided into 6 sections of 500 ohms each. This also applies to the resistor 20 at the receiving station RS.

Referring now to the receiving apparatus RA at this receiving station, the differential relay DR comprises the two electromagnets 23 and 24 which are arranged to act in opposition upon the oscillatory armature 25. This armature is normally biased to a neutral position by a spring or by gravity, and remains in this neutral position as long as both electromagnets 23 and 24 are energized by balanced components of the alternating current passing through the system. As soon as the balanced relation is upset by a preponderating current flowing through one of the branch paths 21 or 22 the electromagnet in that path is more strongly energized, thereby causing the armature 25 to swing toward that electromagnet. Swinging with the armature 25 is a movable contact 26 which normally occupies a position between opposed stationary contacts 27 and 28, the movable contact swinging into engagement with one of the stationary contacts whenever an unbalanced condition arises between the electromagnets 23 and 24. Stationary contact 27 is connected to the coil of auxiliary relay 31, and stationary contact 28 is connected to the coil of auxiliary relay 32. These auxiliary relays are adapted to be energized from any local supply circuit, such as the direct current supply circuit DC1, DC2. The movable contact 26 of the differential relay is connected with supply feeder DC1, and the other ends of the coils of the auxiliary relays 31, 32 are connected to the other supply feeder DC2. When the movable contact 26 engages the stationary contact 27 and completes the circuit through auxiliary relay 31, the energization of this relay closes a control contact 31A which completes a circuit down through conductor 33 extending from feeder DC1 to the rotary stepping switch SA. Similarly, when the movable contact engages the other stationary contact 28 it completes a circuit through the coil of auxiliary relay 32, and the energization of the latter closes a control contact 32A which completes a circuit through conductor 34 leading down from bus DC1 to the other rotary stepping switch SB. The circuit completed through conductor 33 does not energize the stepping coil 35A of stepping switch SA, but is made subject to a contact at stepping switch SA and thence energizes the stepping coil 35B of stepping switch SB. Similarly, the circuit completed through conductor 34 does not energize stepping switch SB but is made subject to a contact in said latter switch and thence energizes the stepping coil 35A of stepping switch SA.

As exemplifying a preferred construction of rotary switch serving as the rotary stepping switches SA and SB, attention is directed to the construction disclosed in the prior patent of James R. Harrington and Boyd H. Smith, No. 2,284,816, issued June 2, 1942, and particularly the embodiment shown in Figures 1 to 13 thereof. While this is the preferred construction of rotary switch for meeting the requirements of our improved system herein disclosed, nevertheless it will be understood that other appropriate constructions of stepping switches may be employed. In the diagrammatic illustration of Figure 5A, the members 37A and 37B are intended to represent the rotating switch arms of the switches SA and SB. The operating relation in both stepping switches is such that the advancing motion of the switch arm occurs on the retraction of the stepping armature, when the stepping coil 35a or 35b is deenergized. The stepping motion of each switch arm in a forward direction is against the tension of a return spring which tends to return the switch arm back to normal position. This return spring comes into action when the release electromagnet 39a or 39b of that particular switch is energized, such release electromagnet serving to attract a holding pawl and thereby release the rotating switch arm for return movement back to normal position. The rotary switch SA is provided with a pilot or pulsing switch 41A, and, similarly, the other rotary switch SB is provided with a similar pilot or pulsing switch 41B. Each pilot or pulsing switch is arranged to move to closed position when the stepping coil 35a or 35b of its respective rotary switch is energized. These two contacts 41A and 41B are connected in parallel to control the energization of a pulsing relay PR, which is of the slow operating, fast releasing type. The contacts 41A and 41B and the winding of pulsing relay PR are connected directly across the supply circuit DC1, DC2 so that the closing of either one of the contacts 41A or 41B is operative to energize the pulsing relay. This pulsing relay is provided with two control contacts PR1 and PR2, both of which move to open position when the relay is energized, but such motion to open position has a time delay because of the characteristic of the relay. Pulsing relay contact PR1 controls the connection of feeder bus DC2 with the stepping coil 35a of switch SA, and pulsing relay contact PR2 controls the connection of feeder bus DC2 with the stepping coil 35b of switch SB.

The switch arm 37A of rotary switch SA normally occupies the position designated "Normal," but with each successive deenergization of the stepping coil 35a this switch arm is stepped progressively to point 1, then to point 2, then to point 3, etc. This same operation occurs in the case of switch arm 37B of rotary switch SB. The normal position of each switch arm may be considered as point 0. At each normal position and at each point position of the switch arms 37A and 37B the switch contacts are arranged in groups of two or more for simultaneous actuation. Each cooperating pair of such contacts will be referred to as a "contact," and the innermost pair disposed closest to the axis of the switch will be considered as contact 1, the next outer pair as contact 2, the next outer pair as contact 3, etc. These contact numbers are hereinafter appended as suffixes to the designations of their respective point positions on their respective switches. Thus, referring to the positions of the three contacts at Normal position or 0 position of stepping switch SA when the switch arm 37A is in such normal position, innermost contact SA01 is closed, next outer contact SA02 is closed, and the outermost contact SA03 is open. At this time, the other contacts SA11, SA12, SA21, SA22 and SA31 and SA32 are all open. This also applies to the other rotary switch SB. It will be noted that line conductor L1 has multiple connection with one of the terminals of each of these innermost contacts SA01, SA11, SA21, SA31, etc., and SB01, SB11, SB21, SB31, etc. The other terminals of each of these innermost contacts have connection with the ends and with the intermediate taps of the resistance element 20. Innermost contacts SA01 and SB01 of the two rotary switches are connected together in series in establishing communication with the center tap of resistor 20. Contact CA02 controls connection between conductor 33 and the stepping coil 35B of switch SB. Similarly, contact SB02 controls connection between conductor 34 and the stepping coil 35A of the other switch SA. Contact SA03 controls connection from conductor 33 to the release coil 39A of its own switch, and, similarly, contact SB03 controls connection from conductor 34 to the release coil 39B of its own switch.

The rotary switches SA and SB are arranged to control a series of indicating devices such as annunciator lamps, annunciator drops, or other suitable indicating devices. In the preferred embodiment shown, we have illustrated in Figure 5B a series of annunciator lamps L1, L2, L3, L4, L5 and L6, each having one terminal connected to the supply bus DC1. The other terminals of these lamps are connected with individual point contacts of the stepping switches. For example lamp L1 is connected with contact SA32, lamp 2 is connected with contact SA22, and lamp L3 is connected with contact SA12. Similarly, lamps L4, L5 and L6 are connected respectively with contacts SB12, SB22 and SB32.

Referring now to the operation of the system, in the normal position of the apparatus the alternating current flows in a balanced relation through the transmitting apparatus and through the receiving apparatus. From the supply circuit C1, C2, the alternating current from one side of the power source flows through the transmitting apparatus where the current is divided into a positive half cycle passing through polarizing stack X and branch 11, and into a negative half cycle passing through polarizing stack Y and branch 12. Each half cycle will then pass through half the length of the variable resistor 10 (i. e. through 1500 ohms) to the center tap, where the two half cycles will be rejoined and again appear as an alternating current. This alternating current will pass through the normally closed contacts of manual switches 13, 14, 15, 16, 17 and 18 to the transmission line where it will be conducted to the receiving apparatus. At the receiving station, the current will pass through contacts SA01 and SB01 of the stepping switches, which switches will be in their normal positions at this time. The positive half cycle will pass through half the tapped resistor 20 (i. e. through 1500 ohms) and thence through the differential relay coil 23 and through the polarizing stack X1 of branch 21. Similarly, the negative half cycle will pass through the other half of the tapped resistor 20 (i. e. through 1500 ohms) and thence through the differential relay coil 24 and through the polarizing stack Y1 of branch 22. The two half cycles will again be rejoined and passed back over the transmission line to the other side of the alternating source. In the normal position of the transmitting and receiving apparatus, the tapped resistors 10 and 20 offer a total resistance of 3000 ohms to each direction of current flow, and hence the current through the two opposing coils 23 and 24 of the differential relay DR will be equal, and the relay will remain in its neutral or balanced position.

When the attendant at the transmitting station TS desires to select and energize a typical point of the annunciator apparatus, such as annunciator lamp L2, he actuates the manually operated switch 14 at the transmitting station. This will decrease the resistance of the circuit to the positive half cycle by 1000 ohms and increase the resistance to the negative half cycle by the same amount. Consequently, the current through the coil 23 of the differential relay DR will be increased, and the current through the other coil 24 of said relay will be decreased, thereby shifting movable contact 26 into engagement with contact 28. Thereupon, auxiliary relay 32 will be energized through contacts 26, 28 and such auxiliary relay will close its control contact 32A. This causes the stepping coil 35A of rotary switch SA to be energised through contact 32A, conductor 34, contact SB02 and (on the other side of coil 35A) through pulsing contact PR1. The energization of the stepping coil 35A causes the pilot switch 41A to close, thereby completing an energizing circuit for the pulsing relay PR. This slowly energizing pulsing relay PR will thereupon slowly open contact PR1, which deenergizes the stepping coil 35A and results in the rotary switch SA being stepped to point 1, the advancing movement of said switch occurring upon the deenergization of stepping coil 35A. When the rotary switch arm 37A is stepped to point 1 the resistance of the divided circuit 21, 22 to the positive half cycle will be increased by 500 ohms, and the resistance of this circuit to the negative half cycle will be decreased by 500 ohms. However, the differential relay DR will remain in its unbalanced condition, with contacts 26 and 28 closed. Hence, this same stepping sequence will be repeated again, the stepping coil 35A becoming reenergized and again closing pilot contact 41A, thereby energizing pulsing relay PR and opening pulsing contact PR1 for again deenergizing the stepping coil 35A. This second stepping sequence advances the rotary stepping switch SA to point 2.

When stepping switch SA arrives at point 2, the differential relay DR will again be restored or replaced to a balanced condition since the stepping switch contact SA21 has now established connection with the next lower tap on the resistor 20, thereby equalizing the current flow through the branch paths of the circuit. By reason of the fact that the differential relay resumes its balanced position, the rotary stepping switch SA will not be advanced beyond point 2, but will remain in this position and will retain annunciator lamp L2 energized through contact SA22.

The system will remain in this condition until manually actuated switch 14 is returned to its normal position.

When manually actuated switch 14 is returned to its normal position, the resistance of the circuit to the positive half cycle will be increased by 1000 ohms, and the resistance of the circuit to the negative half cycle will be decreased by 1000 ohms. This is because rotary stepping switch SA stands at point 2. Such unbalanced electrical condition which arises immediately as soon as manually actuated switch 14 is returned to normal position causes the differential relay DR to be actuated in the other direction, thereby moving contact 26 upwardly into engagement with contact 27. This energizes auxiliary relay 31 and closes the associated relay contact 31A. In as much as rotary stepping switch SA is now standing in a position off normal, its contact SA03 is closed and hence the closing of relay contact 31A completes a circuit through contact SA03 and energizes the release coil 39A of rotary switch SA. The energization of the release coil 39A causes the rotary switch SA to be immediately returned to normal position, and such return of this switch to normal causes the circuit to be again balanced, with line conductor L1 connecting to the midpoint tap of resistor 10 and to the midpoint tap of resistor 20. This completes a typical operating cycle. It will be understood that if either of the manually actuated switches 16, 17 or 18 should be operated the sequence is changed or reversed in the sense that the other stepping switch SB is initially actuated to select the appropriate annunciator lamp, and that this other stepping switch is then restored to normal by the energization of the release coil 39B after the selected manually actuated switch 16—18 has been returned to normal position.

While we have illustrated and described what we regard to be the preferred embodiments of our invention, nevertheless it will be understood that such are merely exemplary, and that numerous modifications and rearrangements may be made thereon without departing from the essence of the invention.

We claim:

1. In an electrical system, the combination of a transmitting station, a receiving station, a signal transmission line between said stations, means for impressing an alternating current on said system, a divided circuit at each of said stations joining with said signal transmission line, operatively directed half-wave rectifiers in the branch paths of said divided circuit, variable impedance means in series with said rectifiers at said transmitting station for displacing the neutral axis of said alternating current from the normal position to a shifted position relatively to the conventional wave form of the current, variable impedance means in series with said rectifiers at said receiving station for restoring the neutral axis of said alternating current from said shifted position back to said normal position, said latter variable impedance means having a center tap to which said signal transmission line is normally connected, a first selecting switch for shifting the point of connection of said transmission line outwardly along said variable impedance means in one direction from said center tap, a second selecting switch for shifting the point of connection of said transmission line outwardly along said variable impedance means in the other direction from said center tap, differential relay means at said receiving station responding to the shifted neutral axis of the alternating current, and means responsive to said differential relay means for controlling said first and second selecting switches.

2. In an electrical system of the class described, the combination of a plurality of stations, a circuit connecting said stations, means for impressing an alternating current on said circuit, transmitting apparatus at one of said stations operative to transmit different signals by shifting the neutral axis of said alternating current selectively either upwardly or downwardly and to different degrees, receiving apparatus at another of said stations comprising differential relay means responding to the direction of shift of said neutral axis, and two rotary switches capable of independent operation and connected to respond to said differential relay means, one of said rotary switches operating to shift the neutral axis back from one direction of shift and the other rotary switch operating to shift the neutral axis back from the other direction of shift.

3. In an electrical system, the combination of a plurality of stations, a circuit connecting said stations, means for impressing an alternating current on said circuit, transmitting apparatus at one of said stations operative to transmit different signals by shifting the neutral axis of said alternating current selectively either upwardly or downwardly, and receiving apparatus at another of said stations comprising two rotary switches, and means for causing one of said rotary switches to be operated if the neutral axis of said alternating current is shifted upwardly, and for causing the other of said rotary switches to be operated if said neutral axis is shifted downwardly.

4. In an electrical system, the combination of a plurality of stations, an interconnecting circuit between said stations, means for impressing an alternating current on said circuit, transmitting apparatus at one of said stations operative to transmit different signals by shifting the neutral axis of said alternating current either upwardly or downwardly, relay means at another of said stations responsive to said shift of the neutral axis, two rotary switches at said latter station, each of said rotary switches comprising a stepping coil and a control contact which is normally closed but is adapted to be opened on the first stepping motion of its respective switch, and circuit connections for the stepping coils of each of said switches extending from said relay means through the control contact of one switch to the stepping coil of the other switch.

5. In an electrical system, the combination of a plurality of stations, a signalling circuit connecting said stations, means for impressing an alternating current on said circuit, transmitting apparatus at one of said stations operative to transmit different signals by shifting the neutral axis of said alternating current either upwardly or downwardly, relay means at another of said stations responsive to said shift of the neutral axis, two rotary switches responsive to said relay means whereby one of said rotary switches is actuated if said shift is in one direction and the other of said rotary switches is actuated if the shift is in the other direction, spring return means for returning said rotary switches to normal positions, release coils for releasing the switches so that they can respond to said spring return means, and means for energizing the release coil of the actuated switch when the transmitting apparatus at said first station restores the neutral axis of said alternating current to normal position.

6. In an electrical system, the combination of a plurality of stations, a circuit connecting said stations, means for impressing an alternating current on said circuit, transmitting apparatus at one of said stations operative to transmit different signals by shifting the neutral axis of said alternating current either upwardly or downwardly, and receiving apparatus at another of said stations comprising relay means responding to the direction of shift of said neutral axis, and first and second rotary switches connected to be responsive to said relay means whereby if said shift is in one direction said first rotary switch is actuated and said second rotary switch remains inert, and if said shift is in the opposite direction said second rotary switch is actuated and said first rotary switch remains inert.

7. In an electrical system, the combination of a plurality of stations, a circuit connecting said stations, means for impressing an alternating current on said circuit, transmitting apparatus at one of said stations operative to transmit different signals by shifting the neutral axis of said alternating current selectively either upwardly or downwardly, and receiving apparatus at another of said stations comprising two rotary switches, stepping apparatus for said rotary switches comprising stepping coils and means for advancing said rotary switches on the deenergization of said stepping coils, and means for causing one of said rotary switches to be operated if the neutral axis of said alternating current is shifted upwardly, and for causing the other of said rotary switches to be operated if said neutral axis is shifted downwardly.

JAMES R. HARRINGTON.
ROGER L. MERRILL.